US009419678B2

(12) United States Patent
Vallestad et al.

(10) Patent No.: US 9,419,678 B2
(45) Date of Patent: Aug. 16, 2016

(54) FAST FREQUENCY HOPPING ADAPTED TO THE ENVIRONMENT

(75) Inventors: Anne Vallestad, Sandvika (NO); Jan Endresen, Slependen (NO); Erik Carlson, Nesoddtangen (NO); Knut Rimstad, Slependen (NO)

(73) Assignee: ABB Research Ltd., Zurich (CH)

( * ) Notice: Subject to any disclaimer, the term of this patent is extended or adjusted under 35 U.S.C. 154(b) by 0 days.

(21) Appl. No.: 14/424,913

(22) PCT Filed: Aug. 30, 2012

(86) PCT No.: PCT/EP2012/066903
§ 371 (c)(1),
(2), (4) Date: Aug. 18, 2015

(87) PCT Pub. No.: WO2014/032721
PCT Pub. Date: Mar. 6, 2014

(65) Prior Publication Data
US 2015/0381231 A1 Dec. 31, 2015

(51) Int. Cl.
*H04B 1/7136* (2011.01)
*H04B 1/713* (2011.01)
*H04B 17/309* (2015.01)
*H04B 1/715* (2011.01)
(Continued)

(52) U.S. Cl.
CPC .............. *H04B 1/7136* (2013.01); *H04B 1/713* (2013.01); *H04B 1/715* (2013.01); *H04B 17/309* (2015.01); *H04W 24/08* (2013.01); *H04B 2001/7154* (2013.01); *H04W 84/22* (2013.01)

(58) Field of Classification Search
None
See application file for complete search history.

(56) References Cited

U.S. PATENT DOCUMENTS

| 5,625,641 A | 4/1997 | Takakusaki |
| 5,627,880 A | 5/1997 | Rozanski et al. |
| 5,640,415 A * | 6/1997 | Pandula ................. H04B 1/713 375/133 |

(Continued)

FOREIGN PATENT DOCUMENTS

| JP | 2001102964 A | 4/2001 |
| WO | 9317507 A1 | 9/1993 |

(Continued)

OTHER PUBLICATIONS

Peter E. Chadwick; "Introduction to Spread Spectrum Techniques"; Circuits and Systems Tutorials, Dec. 11, 1995; 9 pages.

(Continued)

*Primary Examiner* — Chi H Pham
*Assistant Examiner* — Vladislav Agureyev
(74) *Attorney, Agent, or Firm* — Whitmyer IP Group LLC

(57) ABSTRACT

A transmitting node in an industrial wireless network transmits a first number of bits to a receiving node, where at least one bit is partitioned into segments and each segment is transmitted at a different frequency according to a frequency transmission scheme. The receiving node receives the number of bits, determines the quality of each segment of a received bit, collects quality determinations of segments, forms a quality measure for each frequency through combining quality determinations of the corresponding frequency, compares each quality measure with a quality measure criterion, determines at least one frequency that does not fulfill the quality measure criterion and informs the transmitting node about frequencies for which the corresponding quality measures do not fulfill the quality measure criterion. The transmitting node receives the information and updates the frequency transmission scheme.

13 Claims, 5 Drawing Sheets

(51) Int. Cl.
*H04W 24/08* (2009.01)
*H04W 84/22* (2009.01)

(56) References Cited

U.S. PATENT DOCUMENTS

| | | | | |
|---|---|---|---|---|
| 7,280,580 | B1* | 10/2007 | Haartsen | H04B 1/7143 375/132 |
| RE42,236 | E * | 3/2011 | Geile | H03M 13/356 370/203 |
| 2004/0240526 | A1* | 12/2004 | Schmandt | H04B 1/715 375/135 |
| 2005/0008064 | A1* | 1/2005 | Hammes | H04B 1/7143 375/131 |
| 2008/0019422 | A1* | 1/2008 | Smith | H04B 1/692 375/136 |
| 2010/0046583 | A1* | 2/2010 | So | H04L 1/0001 375/133 |
| 2012/0213196 | A1* | 8/2012 | Chung | H04B 1/713 370/330 |

FOREIGN PATENT DOCUMENTS

| | | |
|---|---|---|
| WO | 9745966 A1 | 12/1997 |
| WO | 2005067161 A1 | 7/2005 |
| WO | 2007034133 A1 | 3/2007 |
| WO | 2011099283 A1 | 8/2011 |

OTHER PUBLICATIONS

International Preliminary Report on Patentability Application No. PCT/EP2012/066903 Completed: Dec. 22, 2014 20 pages.
International Search Report & Written Opinion of the International Searching Authority Application No. PCT/EP2012/066903 Completed: Oct. 11, 2013; Mailing Date: Oct. 21, 2013 10 pages.
Written Opinion of the International Preliminary Examining Authority Application No. PCT/EP2012/066903 Issued: Aug. 4, 2014 12 pages.

* cited by examiner

FAST FREQUENCY HOPPING ADAPTED TO THE ENVIRONMENT

FIELD OF INVENTION

The present invention generally relates to wireless communication devices in industrial wireless networks. More particularly the present invention relates to a method, wireless communication device and computer program product for improving communication between nodes in an industrial wireless network and to a method, wireless communication device and computer program product for providing improved communication between nodes in an industrial wireless network.

BACKGROUND

Wireless sensor networks are known to be used in process control systems. Examples on such networks are ZigBee and WirelessHart, ISA100, WIA-PA and Bluetooth. There also exist some WLAN based sensor networks.

Another type of network is Wireless Interface for Sensors and Actuators (WISA). Here data is transmitted with error codes in order to determine if data is received correctly or not. Furthermore, in case data is not received correctly then a retransmission may be made.

One cause of a high number of errors is frequency selective fading. Another cause may be by several devices transmitting at the same frequency as a transmitting unit and may cause a loss of data packets.

One way to address this problem, which is described in WO 2005/067161 is fast frequency hopping. In fast frequency hopping a bit is divided into a number of segments, where each segment is transmitted with a different frequency. Through using frequency hopping it is then possible to lower the number of faulty bits. As several frequencies are used for the same bit, it is thus ensured that even if one frequency is bad and one segment of a bit is received with poor quality, then another segment of the same bit is normally received properly with adequate quality and hence the bit is received correctly.

There is the possibility that different devices simultaneously transmit segments with the same frequency. However, if they have different transmission schemes, this will often only happen rarely.

There may be more than one wireless network in the same area and theses network may also interfere with each other. There may for instance be a Wireless Local Area Network (WLAN) in the same are as a WISA network. A WLAN network normally only uses the same frequency. This frequency may have a serious influence on the bit error rate of the WISA system.

It would therefore be of interest to improve upon this situation.

SUMMARY OF THE INVENTION

The present invention is directed towards providing an improved industrial wireless communication network.

One object of the present invention is to provide a method for providing improved communication between nodes in an industrial wireless network.

This object is according to a first aspect of the present invention achieved through a method for providing improved communication between nodes in an industrial wireless network, the method being performed by a receiving node in the industrial wireless communication network and comprising the steps of:

receiving a number of bits from a transmitting node, where at least one bit is partitioned into segments and each segment is transmitted at a different frequency according to a frequency transmission scheme, determining the quality of reception of each segment of a received bit, collecting quality determinations of segments, forming a quality measure for each frequency through combining quality determinations of the corresponding frequency, comparing each quality measure with a quality measure criterion, determining if at least one quality measure fails to fulfil the quality measure criterion, and informing the transmitting node about frequencies for which the corresponding quality measures do not fulfil the quality measure criterion.

Another object of the present invention is to provide an improved wireless communication device acting as a receiving node in an industrial wireless network.

This object is according to a second aspect of the present invention achieved through a wireless communication device for providing improved communication between nodes in an industrial wireless network, the wireless communication device providing a receiving node in the industrial wireless network and comprising:

a wireless transmitter, a wireless receiver configured to receive a number of bits from a transmitting node, where at least one bit is partitioned into segments and each segment is transmitted at a different frequency according to a frequency transmission scheme, a quality determining unit configured to determine the quality of each segment of a received bit, and a frequency investigating unit configured to:

collect quality determinations of segments, form a quality measure for each frequency through combining quality determinations of the corresponding frequency, compare each quality measure with a quality measure criterion, determine if at least one frequency fails to fulfill the quality measure criterion, and inform the transmitting node about frequencies for which the corresponding quality measures do not fulfil the quality measure criterion.

Another object of the present invention is to provide a computer program product for a wireless communication device acting as a receiving node, which computer program product provides an improved wireless communication device.

This object is according to a third aspect achieved by a computer program product for a wireless communication device, the wireless communication device providing a receiving node in an industrial wireless network, the computer program product comprising a data carrier with computer program code which when run on a processor forming a frequency investigating unit of the receiving node, causes the receiving node to:

receive a number of bits from a transmitting node, where at least one bit is partitioned into segments and each segment is transmitted at a different frequency according to a frequency transmission scheme, determine the quality of reception of each segment of a received bit,
collect quality determinations of segments,
form a quality measure for each frequency through combining quality determinations of the corresponding frequency,
compare each quality measure with a quality measure criterion,
determine if at least one quality measure fails to fulfill the quality measure criterion, and
inform the transmitting node about frequencies for which the corresponding quality measures do not fulfill the quality measure criterion.

Another object of the present invention is to provide a method for improving communication between nodes in an industrial wireless network.

This object is according to a fourth aspect achieved by a method for improving communication between nodes in an industrial wireless network, the method being performed by a transmitting node of the industrial wireless network and comprising the steps of:
transmitting a first number of bits to a receiving node, where at least one bit is partitioned into segments and each segment is transmitted at a different frequency according to a frequency transmission scheme,
receiving information from the receiving node about frequencies for which corresponding quality measures do not fulfil a quality measure criterion, the fulfillment of a quality measure criterion being based on a comparison of a quality measure with the criterion,
said quality measure being formed as a combination of quality determinations made for segments transmitted at the frequency,
updating the frequency transmission scheme, where the updating comprises reducing the use of frequencies for which the corresponding quality measures do not fulfil a quality measure criterion, and
transmitting a second number of bits using the updated frequency transmission scheme.

Yet another object of the present invention is to provide an improved wireless communication device acting as a transmitting node.

This object is according to a fifth aspect achieved through a wireless communication device for improving communication between nodes in an industrial wireless network, the wireless communication device providing a transmitting node in the industrial wireless network and comprising:
  a wireless transmitter configured to transmit a first number of bits to a receiving node, where at least one bit is partitioned into segments and each segment is transmitted at a different frequency according to a frequency transmission scheme,
  a wireless receiver configured to receive information from the receiving node about frequencies for which corresponding quality measures do not fulfil a quality measure criterion, the fulfillment of a quality measure criterion being based on a comparison of a quality measure with the criterion, said quality measure being formed as a combination of quality determinations made for segments transmitted at the frequency, and
  a transmission scheme updating unit configured to:
    update the frequency transmission scheme, where the updating comprises reducing the use of frequencies for which the corresponding quality measures do not fulfil the quality measure criterion, and
    order the wireless transmitter to transmit a second number of bits using the updated frequency transmission scheme.

Yet another object is to provide a computer program product for a wireless communication device acting as a transmitting node, which computer program product provides an improved wireless communication device.

This object is according to a sixth aspect achieved through a computer program product for a wireless communication device, the wireless communication device providing a transmitting node in the industrial wireless network,
the computer program product comprising a data carrier with computer program code which when run on a processor forming a transmissions scheme updating unit of the receiving node, causes the receiving node to:
transmit a first number of bits to a receiving node, where at least one bit is partitioned into segments and each segment is transmitted at a different frequency according to a frequency transmission scheme,
receive information from the receiving node about frequencies for which corresponding quality measures do not fulfill a quality measure criterion, the fulfillment of a quality measure criterion being based on a comparison of a quality measure with the criterion, said quality measure being formed as a combination of quality determinations made for segments transmitted at the frequency,
update the frequency transmission scheme, where the updating comprises reducing the use of frequencies for which the corresponding quality measures do not fulfill a quality measure criterion, and
transmit a second number of bits using the updated frequency transmission scheme.

The present invention has a number of advantages.

It enables the possibility to consider the environment in which the first wireless network is provided when performing fast frequency hopping. The invention allows the frequencies used by other networks to be identified and avoided to be used, which improves the function of all networks at the expense of a small number of fewer frequencies that cannot be used or can only be used sparingly. As the fast frequency hopping is performed for each bit, the determination of such frequencies is furthermore fast. A safe determination can be made within a low number of bits.

BRIEF DESCRIPTION OF THE DRAWINGS

The present invention will in the following be described with reference being made to the accompanying drawings, where
FIG. 1 schematically shows a control system for controlling a process using a first industrial wireless network provided close to a second wireless network.

DETAILED DESCRIPTION OF THE INVENTION

In the following, a detailed description of preferred embodiments of the invention will be given.

Figure 1:
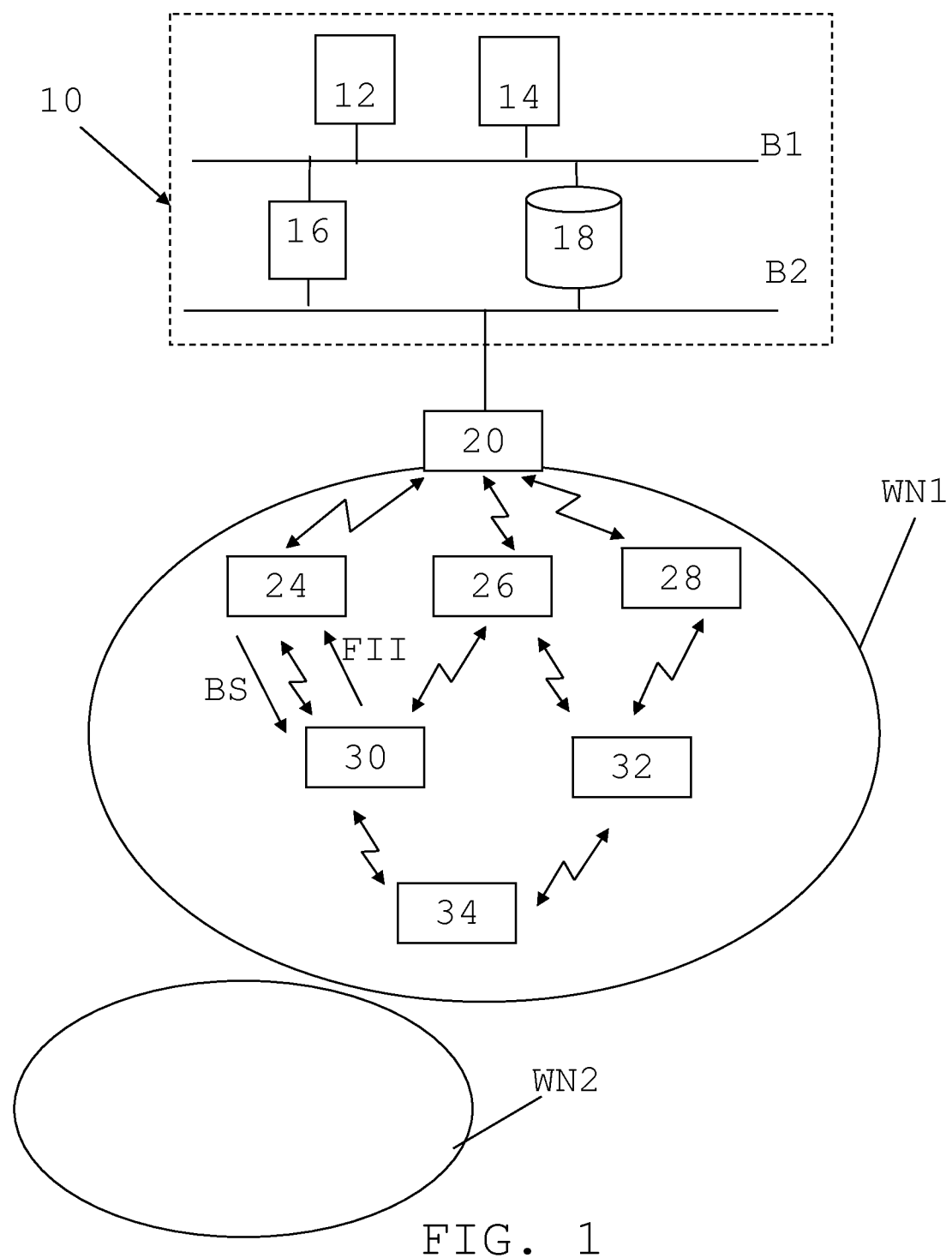

FIG. 1 schematically shows a control system 10 for a process, i.e. a process control system. The process may be an industrial process and may furthermore be any of a number of different types of processes such as a pulp and paper production process, an oil refining process, an electric power transmission process or an electric power distribution process. The control system 10 may for instance be an object based computerised system for controlling the process.

In FIG. 1 the process control system 10 includes a number of operator terminals 12 and 14 connected to a first bus B1. There is furthermore a second bus B2 and between the first and second busses there are connected a server 16 providing control and monitoring of the process and a database 18 where data, like historical data relating to control and monitoring of the process is stored. To the second bus B2 there is furthermore connected a gateway 20, which gateway is in turn connected to a first wireless network WN1. The first wireless network WN1 may be an industrial network and may also be a wireless communication network. It may more particularly be a wireless sensor and actuator network (WSAN) and may thus be an industrial wireless sensor and actuator network. The network may be a network of the type Wireless Interface for Sensors and Actuators (WISA). It may as an example use frequencies in the unlicensed radio band, i.e. in the frequency range of the industrial, scientific and medical radio bands (ISM). In this first wireless network WN1 there are shown seven exemplifying nodes. There is a first node 24, a second node 26, a third node 28, a fourth node 30, a fifth node 32 and a sixth node 34. These nodes are provided in the form of wireless communication devices or wireless field devices. These field devices as well as the gateway 20 are nodes in the first industrial wireless network WN1. The gateway 20 may therefore be considered to be a seventh node.

The field devices are devices that are interfaces to the process and they communicate wirelessly with the gateway 20. In the exemplifying network the first, second and third nodes 24, 26, 28 are furthermore shown as communicating with the gateway 20, while the fourth and fifth nodes 30 and 32 are communicating with the first, second and third nodes 24, 26 and 28. The sixth node 34 in turn communicates with the fourth and fifth nodes 30 and 32. Although the fourth, fifth and sixth nodes 30, 32 and 34 do not communicate directly with the gateway 20, they are still able to communicate with it using hop or multi-hop technique. When for instance the sixth node 34 is sending data, this data is relayed to the gateway 20 via the fifth or sixth node together with via the first, second or third node 24, 26 and 28. In a similar manner the first, second and third node 24, 26, 28 may act as relay nodes for data sent by the fourth and fifth nodes 30 and 32. Although the nodes are shown as using hop and multi-hop techniques, it should be realized that the invention is in no way limited to employing hops.

The field devices implementing the first, second, third, fourth, fifth and sixth nodes 24, 26, 28, 30, 32 and 34 may typically be responsible for performing some type of control activity of the process, such as measuring a process parameter like a physical property of the process or providing a control activity in the process, such as actuating a valve, operating a pump, a switch etc. The actual control of the field devices is performed by the server 16. This control may furthermore be a closed-loop real-time control of the industrial process.

The first field device 24 is here furthermore a transmitting node or a transmitting wireless device in that it is transmitting a bit sequence BS to the fourth field device 30, while the fourth field device 30 is a receiving node receiving data from the transmitting node. The receiving node is here shown as transmitting a frequency informing instruction FII.

There is also a second wireless network WN2 in the area, i.e. close to the first wireless network WN1. This second network WN2 is as an example a wireless local area network (WLAN) using one or more fixed frequencies. These frequencies may furthermore be provided in the same frequency range as that which the first wireless network WN1 uses.

Figure 2:
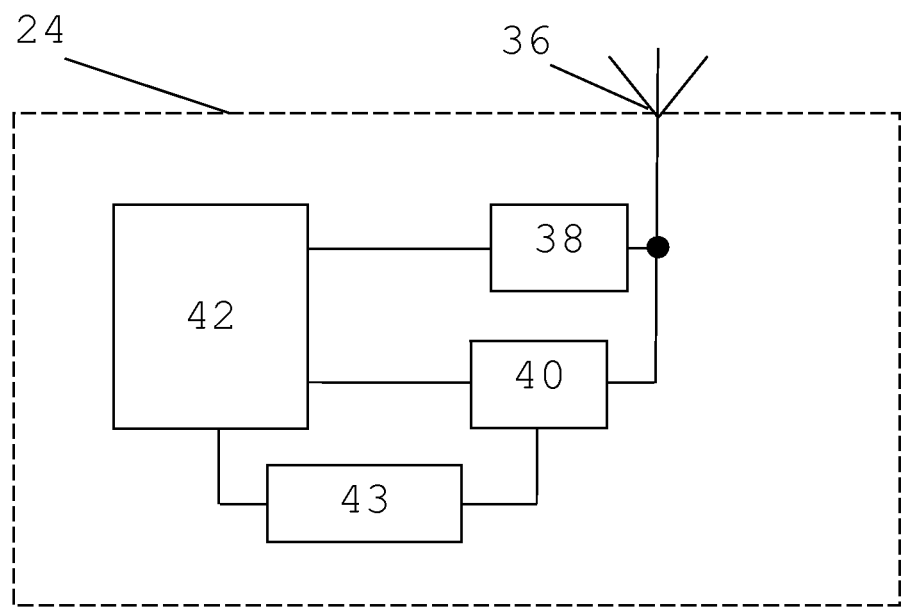
FIG. 2 shows a block schematic of a first wireless device of the first network being a transmitting node,
FIG. 3 schematically shows frequencies of a frequency transmission scheme being stored in a transmission scheme memory of the transmitting node.

FIG. 2 shows a block schematic of the transmitting node 24. The transmitting node 24, which may be battery-powered, comprises a transmission scheme updating unit 42, which is connected to a transmitter circuit 40 or wireless transmitter. The transmitter circuit 40 is in turn connected to an antenna 36, which is also connected to a receiver circuit 38 or wireless receiver. The receiver and transmitter circuits 40 and 38 may be combined in one circuit, a transceiver circuit. The transmission scheme updating unit 42 and transmitting unit 40 are also connected to a transmissions scheme memory 43. The transmission scheme memory 43 comprises a frequency transmission scheme FTS indicating frequencies used in the transmissions to other nodes.

Figure 3:
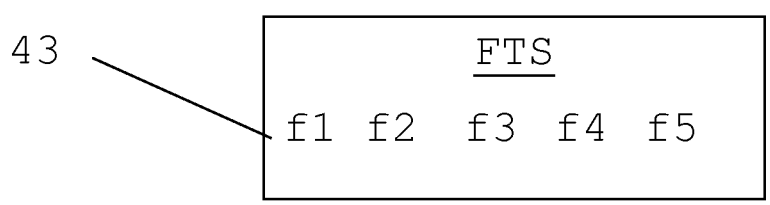

The contents of this memory 43 are schematically shown in FIG. 3, where there is a first, second third, fourth and fifth frequency f1, f2, f3, f4 and f5 used in the frequency transmission scheme FTS. The number of frequencies of the scheme used here is only exemplifying. It should be realized that the number of frequencies used in a scheme may be fewer but also considerably more.

Figure 4:
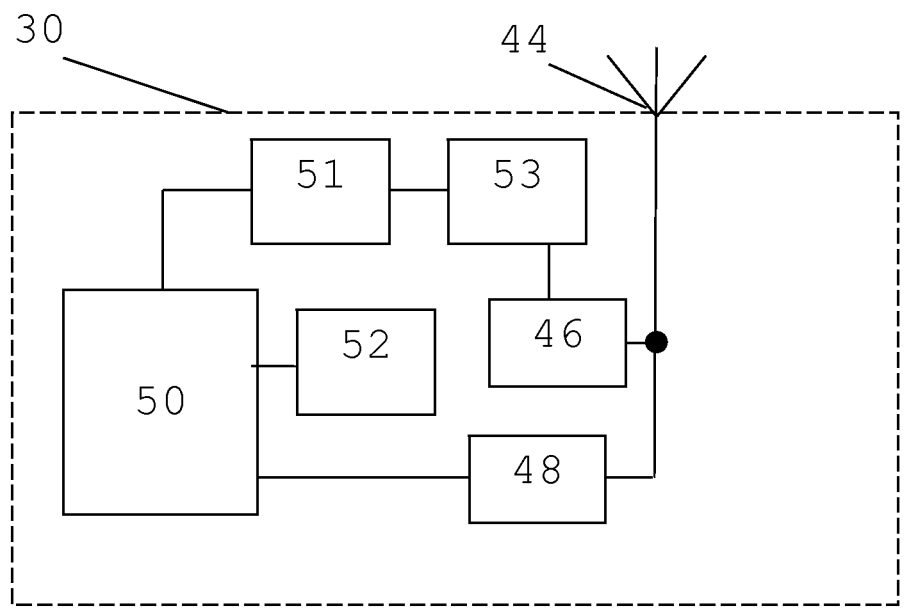
FIG. 4 shows a block schematic of a second wireless device of the first network being a receiving node.

FIG. 4 shows a block schematic of units of the receiving node 30 in the industrial wireless network. The receiving node 30, which may also be battery powered, here comprises a frequency investigating unit 50, which is connected to a transmitter circuit 48 or wireless transmitter. The transmitter circuit 48 is in turn connected to an antenna 44, which is also connected to a receiver circuit 46 or wireless receiver. The receiver and transmitter circuits 46 and 48 may also here be combined in one circuit, a transceiver circuit. The frequency investigating unit 50 is also connected to a quality measure memory 52. In the wireless communication device 43 there is also a quality determining unit 53 connected between the receiver circuit 46 and a quality determination memory 51, which in turn is connected to the frequency investigating unit 50.

Figure 5:
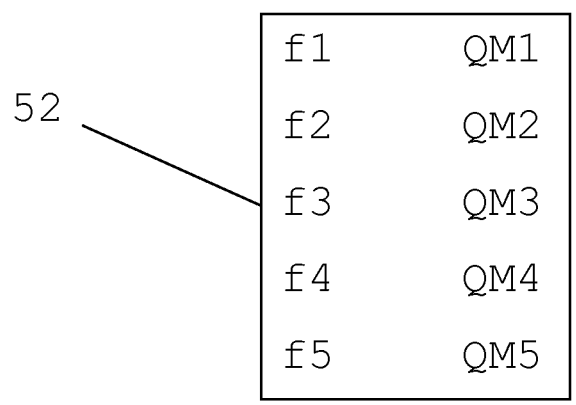
FIG. 5 shows the content of a quality measure memory of the receiving node,
FIG. 6 schematically shows the content of a quality determination memory of the receiving node,
FIG. 7 schematically shows a bit sequence being transmitted from the transmitting node to the receiving node, where one bit is shown as being divided into segments.

FIG. 5 schematically shows the content of the quality measure memory 52. It comprises quality measures that have been determined for the various frequencies of the frequency transmission scheme used by the transmitter node. It therefore comprises a first quality measure QM1 provided for the first frequency f1, a second quality measure QM2 provided for the second frequency f2, a third quality measure QM3 provided for the third frequency f3, a fourth quality measure QM4 provided for the fourth frequency f4 and a fifth quality measure QM5 provided for the fifth frequency f5. As the number of frequencies can be both fewer and more than five, also the number of quality measures can vary correspondingly.

Figure 6:
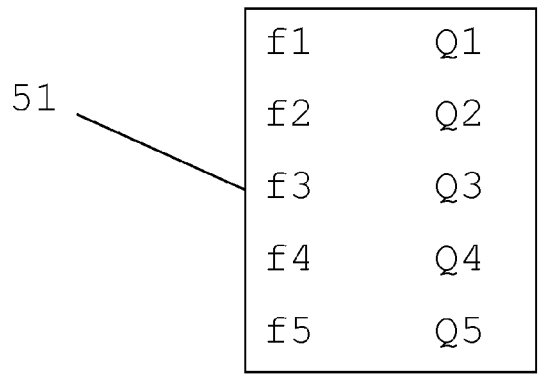

FIG. 6 schematically shows the content of the quality determination memory 51. It comprises quality determinations that have been determined for the various segments of a transmitted data stream and are here also linked to the frequencies of the frequency transmission scheme. It therefore comprises a first quality determination Q1 linked to the first frequency f1, a second quality determination Q2 linked to the second frequency f2, a third quality determination Q3 linked to the third frequency f3, a fourth quality determination Q4 linked to the fourth frequency f4 and a fifth quality determination Q5 linked to the fifth frequency f5. As the number of frequencies can be both fewer and more than five, also the number of quality determinations can vary correspondingly.

The above mentioned transmitting and receiving nodes are merely examples. All nodes including the gateway may be a transmitting node as well as a receiving node, because they may all have the functionality described below.

Figure 7:
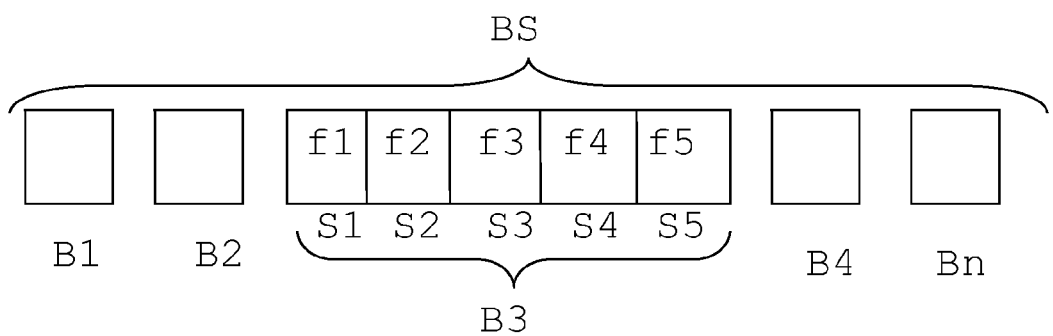
Figure 8:
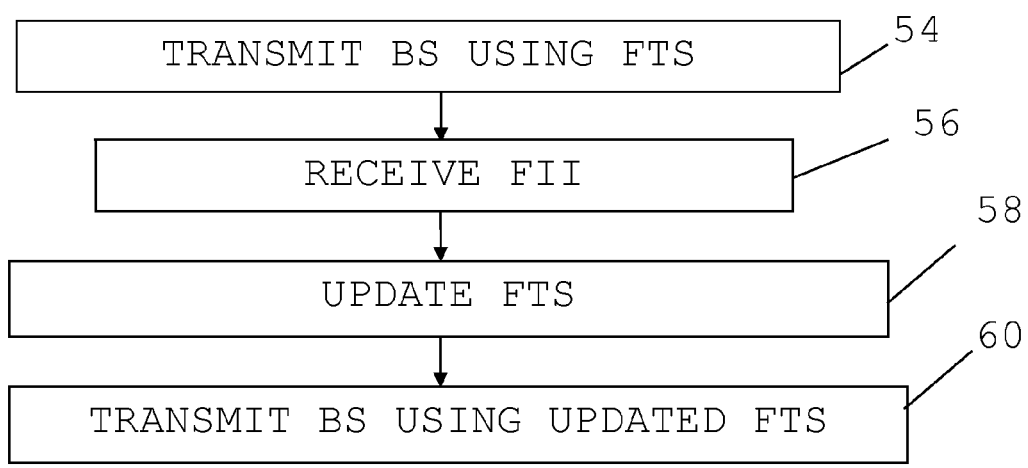
FIG. 8 shows a flow chart of a number of method steps in a method for improving communication between nodes in an industrial wireless network, the method being performed by the transmitting node.
Figure 9:
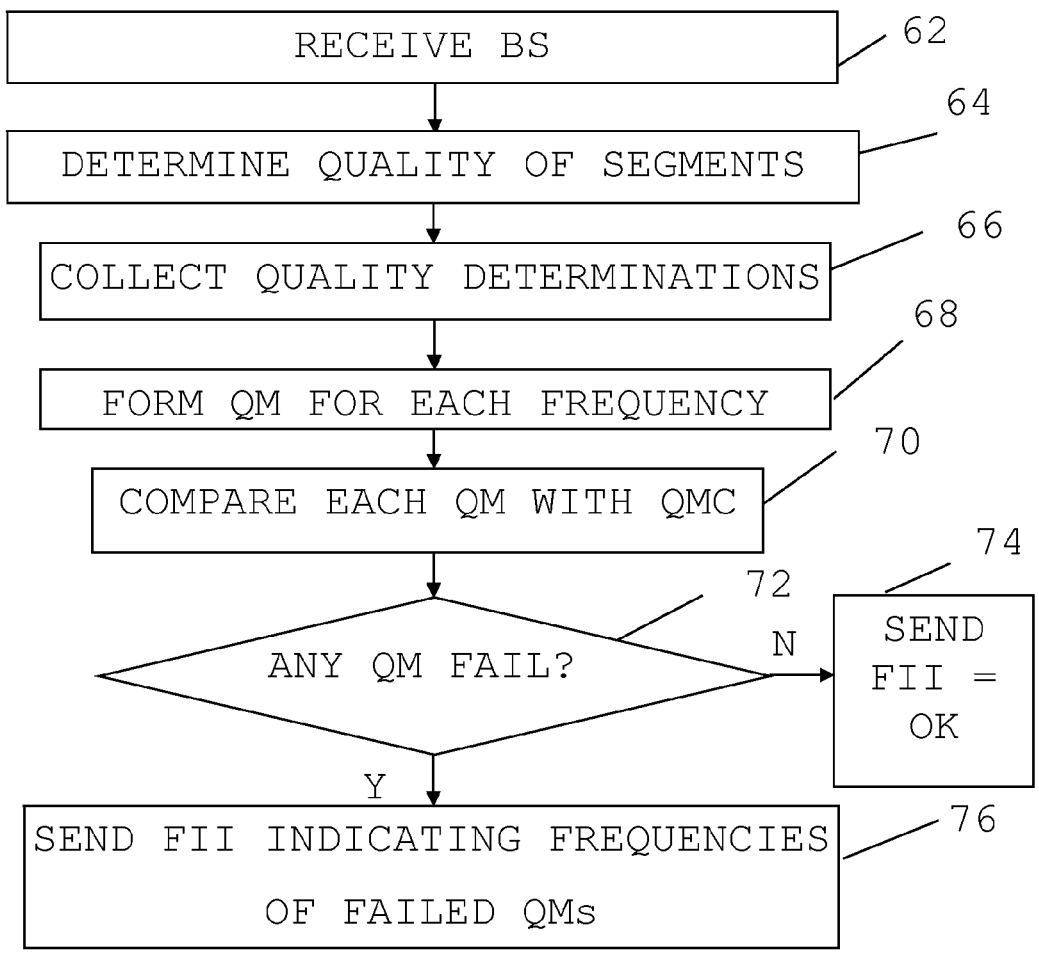
FIG. 9 shows a flow chart of number of method steps in a method for providing improved communication between nodes, the method being performed by the receiving node, and FIG. 10 schematically shows a data carrier carrying program code for implementing a transmitting or a receiving node.

The functioning of the present invention will now be described with reference also being made to FIGS. 7, 8 and 9, where FIG. 7 schematically shows a bit sequence BS being transmitted from the transmitting node 24 to the receiving node 30, where one bit B3 is divided into segments S1, S2, S3, S4 and S5, FIG. 8 shows a flow chart of a number of method steps in a method for improving communication between nodes in an industrial wireless network being performed by the transmitting node 24 and FIG. 9 shows a flow chart of number of method steps in a method for providing improved communication between nodes, the method being performed by the receiving node 30.

The nodes communicate with each other according to different frequency transmission schemes. These schemes typically differ from each other, even though the same frequencies may be used. However, the order in which frequencies are used in the schemes may differ from node to node. In the examples given earlier a scheme of five frequencies was shown. It should be realized that a scheme may employ several more frequencies. There may for instance be more frequencies than segments and consequently it is also possible that not all frequencies are used in a bit. It is furthermore possible that the order in which frequencies are used in a scheme changes from bit to bit.

The nodes furthermore employ fast frequency spread spectrum technology. This means that when transmitting a bit stream BS, then at least one bit and with advantage all bits of the bit stream BS are divided into segments S1, S2, S3, S4 and S5 and every segment is transmitted at a different frequency. The number of segments are here exemplified by five segments. It should however be realized that the number may be fewer but also more.

One exemplifying transmission between two nodes will in the following be described in relation to the transmitting and receiving nodes 24 and 30, where transmitting node 24 transmits data to the receiving node 30. It should be realized that the same principles described below can be applied on all nodes of the first wireless network WN1. The principles may also be applied by all nodes in any direction, i.e. away from or towards the gateway 20.

The transmitting unit 40 of the transmitting node 24 thus transmits a bit sequence BS, i.e. a sequence of bits using a frequency transmission scheme FTS, step 54. These bits are here a first number of bits, which as an example may be 1600 bits corresponding to 200 bytes. In FIG. 7 the sequence BS is exemplified by the bits B1, B2, B3 . . . Bn. In this transmission at least one bit is divided or partitioned into segments and with advantage all bits are divided into segments, where the number of segments may be at least two. In this embodiment the bit is being exemplified by five segments. The third bit B3 is therefore shown as being divided into five segments S1, S2, S3, S4 and S5. Each segment is furthermore transmitted at a different frequency according to the frequency transmission scheme FTS of the transmitting node 24, where the frequency transmission scheme may define the frequencies and the order in which these frequencies are to be used in a bit. Therefore a first segment S1 is transmitted with the first frequency f1, a second segment S2 transmitted with the second frequency f2, a third segment S3 with the third frequency f3, a fourth segment S4 with the fourth frequency f4 and a fifth segment S5 with the fifth frequency f5. The transmission is furthermore performed using the transmitter circuit 40 and antenna 36.

In this way segments S1, S2, S3, S4 and S5 are transmitted using the frequencies f1, f2, f3, f4 and f5 in the order specified by the scheme FTS. The frequencies f1, f2, f3, f4 and f5 are furthermore provided in a frequency band that may be shared with other wireless networks, such as in the ISM band. Because of this some of the frequencies may be unsuitable. The transmitting and receiving nodes 24 and 30 are adapted to handle this situation.

The receiving node 30 receives the transmitted bit sequence BS, step 62. The bit sequence BS is more particularly received by the receiving circuit 46 via the antenna 44, from where it is provided to the quality determining unit 53. It may also be provided to a decoder for decoding purposes. However, the decoding is not any real part of the invention, why it will not be described in any further detail.

The frequency investigating unit 53 investigates the segments S1, S2, S3, S4 and S5 of the data bits B1, B2, B3, . . . Bn. More particularly it investigates the segments with regard to the frequencies used. It determines the quality of reception of each segment of the transmitted bits in the bit streams, step 64. The quality may for instance be determined as a signal strength value, such as a signal to noise ratio. The quality may thus be determined based on the strength or power level of a received segment.

Thereafter the frequency investigating unit 53 stores the quality determinations in the quality determination memory 51. The quality determinations may furthermore be stored linked to the frequency. The various quality determinations may thus be grouped according to frequency in the memory 51. The quality determination Q1 of the first segment S1 may thus be stored linked to the first frequency f1, the quality determination Q2 of the second segment S2 stored linked to the second frequency f2, the quality determination Q3 of the third segment S3 stored linked to the third frequency f3, the quality determination Q4 of the fourth segment S4 stored linked to the fourth frequency f4 and the quality determination Q5 of the fifth segment S5 stored linked to the fifth frequency f5. In this way the quality determinations of several bits in the bit stream are stored in the memory linked to frequency. Since only the segments of the third bit B3 are shown in FIG. 7, only the quality determinations made in relation to the segments of this third bit B3 are shown in FIG. 5. It should however be realized that the quality determination memory 51 will comprise determinations also of other segments.

When this has been done the frequency investigating unit 50 thereafter forms a quality measure for each frequency. In order to do this it collects quality determinations from the quality determination memory 51 and thereafter forms a quality measure for each frequency f1, f2, f3, f4 and f5 used in the first wireless network WN1. It does this through obtaining a number of quality determinations associated with a certain frequency and forming a corresponding quality measure. It may here collect a sufficient number of determinations, such as five or ten, which may be five or ten consecutive determinations made for the frequency. In the given example it thus forms a first quality measure QM1 for the first frequency f1, a second quality measure QM2 for the second frequency, a third quality measure QM3 for the fourth frequency and a fifth quality measure QM5 for the fifth frequency f5. The frequency investigating unit 50 thus forms a quality measure QM for each frequency used for transmission by the transmitting node 24, step 68. The combination may be a summing of the determinations of a frequency. It may also involve an averaging of the quality determinations or the obtaining of a median of the quality determinations of a frequency.

These quality measures QM may then be stored in the quality measure memory 52. The quality measure QM1 for the first frequency f1, the quality measure QM2 for the second frequency f2, the quality measure QM3 for the third frequency f3, the quality measure QM4 for the fourth frequency f4 and the quality measure QM5 for the fifth frequency f5 may thus be stored in the quality measure memory 52.

Thereafter the frequency investigating unit 50 compares each quality measure QM with a quality measure criterion QMC, step 70, which may be a criterion that is the same for all frequencies. As an alternative it may differ between at least some frequencies. The criterion may be set as quality measure or quality determination threshold, which may be a signal strength threshold corresponding to a non-received or incorrectly received bit segment.

The frequency investigating unit 50 then determines if any of the quality measures fails the quality measure criterion, which may be that they do not reach the threshold. If any quality measure fails the criterion, step 72, the frequency investigating unit 50 sends a frequency informing instruction FII to the transmitting node 24, informing this node about frequencies corresponding to quality measures that failed their corresponding criterion, step 76, while if all fulfil the criterion, it sends a frequency informing instruction FII informing the transmitting node 24 that all frequencies can be used, step 74. The instruction FII may in both cases be sent through connecting to the transmitter circuit 48, which then transmits the frequency informing instruction FII to the transmitting node 24 via the antenna 44.

The receiver circuit 38 of the transmitting node 24 then receives the frequency informing instruction FII from the receiving node 30, step 56, which instruction FII informs the transmitting node 24 about the frequencies corresponding to one or more failed quality measures, which instruction indicates that these frequencies should be avoided. The instruction is then forwarded to the transmission scheme updating unit 42.

If all frequencies were deemed to fulfil the criterion, then no updating is performed. However, if one or more frequencies were deemed not to fulfil the criterion, then the frequency transmission scheme FTS is updated, step 58. The update is a reduction of the use of these frequencies. The reduction may be a total reduction, which may be that the transmission scheme updating unit 42 removes all such frequencies from the memory 43. It may as an alternative involve reducing the rate with which they are re-used in the scheme to a lower rate.

In the latter case they may be used, but less frequently than frequencies for which the quality measure meets the criterion. Thereafter the scheme in the transmissions scheme memory 43 is updated. The transmitter circuit 40 thereafter transmits a new bit sequence, now with the updated scheme, step 60.

In this way it is possible to consider the environment in which the first wireless network WN1 is provided. In fast frequency hopping some wireless devices may at times use the same frequency. This is not so serious and should not involve removal of the frequencies. Such removal of frequencies only used in the first network WN1 would in time in fact increase the probability of frequency collision and an eventual barring of all frequencies.

However, there may be other wireless networks in the area that always use the same frequencies, such as the second wireless network WN2. In this case the invention allows these frequencies to be identified and the use of these to be avoided in the first wireless network WN1, which improves the function of both networks at the expense of a small number of fewer frequencies that cannot be used or can only be used sparingly. This removal of frequencies providing a constant interference will further reduce the retransmissions. This is especially important in closed-loop real-time control of industrial processes, where it is important to act fast on measurements made in the process. Every transmission consumes power. Therefore the reduction of retransmissions also saves energy, which is of importance when the nodes are battery powered.

As the fast frequency hopping is performed for each bit, the determination is furthermore fast. A correct determination can be made within a low number of bits such as two, five or ten.

Figure 10:
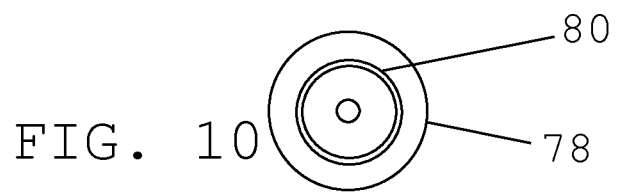

The node frequency investigating unit and transmission scheme updating unit may both be realized in the form of discrete components, such as a Application Specific Integrated Circuits (ASIC) or Field-Programmable Gate Array (FPGA) circuits, which may also comprise the other units and circuits of the transmitting and receiving nodes. As all nodes may have the functionality of the above-describe transmitting and receiving nodes, the units may be provided in the same circuit. The frequency investigating unit 50 and transmission scheme updating unit may also each be realized through a processor with an associated program memory including computer program code for performing their functions. These codes can be combined in the same code. This computer program product can be provided as a data carrier such as one or more CD ROM discs or one or more memory sticks carrying computer program code, which provides the above-described frequency investigating unit and transmission scheme updating unit when being run by said processor. One such data carrier 78 in the form of a CD ROM disk with a computer program 80 carrying such computer program code is schematically shown in FIG. 10.

From the foregoing discussion it is evident that the present invention can be varied in a multitude of ways. It shall consequently be realized that the present invention is only to be limited by the following claims.

The invention claimed is:

1. A method for providing improved communication between nodes in an industrial wireless network, the method being performed by a receiving node in the industrial wireless communication network and comprising the steps of:

receiving a first number of bits from a transmitting node, said bits being partitioned into segments and each segment of a bit being transmitted at a different frequency according to a frequency transmission scheme, said bits being used in closed-loop real-time control of an industrial process, determining the quality of reception of each segment of the first number of bits, collecting quality determinations of segments, forming a quality measure for each frequency through combining quality determinations of the corresponding frequency, comparing each quality measure with a quality measure criterion, determining, within ten bits, if at least one quality measure fails to fulfill the quality measure criterion, and informing the transmitting node about frequencies for which the corresponding quality measures do not fulfil the quality measure criterion for letting the transmitting node transmit a second number of bits with an updated frequency transmission scheme, in which scheme the use of frequencies for which the corresponding quality measures do not fulfil a quality measure criterion has been totally reduced and the frequencies removed so they cannot be used in the wireless network.

2. The method according to claim 1, wherein the network comprises several transmitting nodes, each using a different frequency transmission scheme.

3. The method according to claim 2, wherein the frequency transmission scheme defines the order in which frequencies are to be used in transmitting segments of a data bit.

4. The method according to claim 1, wherein the combining of quality determinations of a corresponding frequency is a combining of at least five quality determinations.

5. A wireless communication device for providing improved communication between nodes in an industrial wireless network, the wireless communication device providing a receiving node in the industrial wireless network and comprising:
   a wireless transmitter,
   a wireless receiver configured to receive a first number of bits from a transmitting node, said bits being partitioned into segments and each segment of a bit being transmitted at a different frequency according to a frequency transmission scheme and being used in closed-loop real-time control of an industrial process,
   a quality determining unit configured to determine the quality of each segment of the first number of bits, and
   a frequency investigating unit configured to:
      collect quality determinations of segments,
      form a quality measure for each frequency through combining quality determinations of the corresponding frequency,
      compare each quality measure with a quality measure criterion,
      determine, within ten bits, if at least one frequency fails to fulfill the quality measure criterion, and
   inform the transmitting node about frequencies for which the corresponding quality measures do not fulfil the quality measure criterion for letting the transmitting node transmit a second number of bits with an updated frequency transmission scheme, in which scheme the use of frequencies for which the corresponding quality measures do not fulfil a quality measure criterion has been totally reduced and the frequencies removed so they cannot be used in the wireless network.

6. The wireless communication device according to claim 5, wherein frequency investigating unit is configured to combine at least five quality determinations.

7. A computer program product for a wireless communication device, the wireless communication device providing a receiving node in an industrial wireless network,
   the computer program product comprising a non-transitory data carrier with computer program code which when run on a processor forming a frequency investigating unit of the receiving node, causes the receiving node to:
      receive a first number of bits from a transmitting node, said bits being partitioned into segments and each segment of a bit being transmitted at a different frequency according to a frequency transmission scheme, said bits being used in closed-loop real-time control of an industrial process,
      determine the quality of reception of each segment of the first number of bits,
      collect quality determinations of segments,
      form a quality measure for each frequency through combining quality determinations of the corresponding frequency,
      compare each quality measure with a quality measure criterion,
      determine, within ten bits, if at least one quality measure fails to fulfill the quality measure criterion, and
      inform the transmitting node about frequencies for which the corresponding quality measures do not fulfill the quality measure criterion for letting the transmitting node transmit a second number of bits with an updated frequency transmission scheme, in which scheme the use of frequencies for which the corresponding quality measures do not fulfil a quality measure criterion has been totally reduced and the frequencies removed so they cannot be used in the wireless network.

8. A method for improving communication between nodes in an industrial wireless network, the method being performed by a transmitting node of the industrial wireless network and comprising the steps of:
   transmitting a first number of bits to a receiving node, said bits being partitioned into segments and each segment of a bit being transmitted at a different frequency according to a frequency transmission scheme, said bits being used in closed-loop real-time control of an industrial process,
   then receiving information from the receiving node about frequencies for which corresponding quality measures have, within ten bits, been determined to fail to fulfil a quality measure criterion, a quality measure being formed as a combination of quality determinations made for segments transmitted at said frequency,
   updating the frequency transmission scheme, where the updating comprises totally reducing the use of frequencies for which the corresponding quality measures do not fulfil a quality measure criterion and removing the frequencies so they cannot be used in the wireless network, and
   transmitting a second number of bits using the updated frequency transmission scheme.

9. The method according to claim 8, wherein the network comprises several transmitting nodes, each using a different frequency transmission scheme.

10. The method according to claim 8, wherein the frequency transmission scheme defines the order in which frequencies are to be used in transmitting segments of a data bit.

11. The method according to claim 8, wherein the combining of quality determinations of a corresponding frequency has been made on at least five quality determinations.

12. A wireless communication device for improving communication between nodes in an industrial wireless network, the wireless communication device providing a transmitting node in the industrial wireless network and comprising:
   a wireless transmitter configured to transmit a first number of bits to a receiving node, said bits being partitioned into segments and each segment of a bit being transmitted at a different frequency according to a frequency transmission scheme, said bits being used in closed-loop real-time control of an industrial process,
   a wireless receiver configured to then receive information from the receiving node about frequencies for which corresponding quality measures have, within ten bits, been determined to fail a quality measure criterion, a quality measure being formed as a combination of quality determinations made for segments transmitted at said frequency, and a transmission scheme updating unit configured to:
- update the frequency transmission scheme, where the updating comprises totally reducing the use of frequencies for which the corresponding quality measures do not fulfil the quality measure criterion and remove the frequencies so they cannot be used in the wireless network, and
- order the wireless transmitter to transmit a second number of bits using the updated frequency transmission scheme.

13. A computer program product for a wireless communication device, the wireless communication device providing a transmitting node in the industrial wireless network, the computer program product comprising a non-transitory data carrier with computer program code which when run on a processor forming a transmission scheme updating unit of the transmitting node, causes the transmitting node to:

transmit a first number of bits to a receiving node, said bits being partitioned into segments and each segment of a bit being transmitted at a different frequency according to a frequency transmission scheme, said bits being used in closed-loop real-time control of an industrial process, receive information from the receiving node about frequencies for which corresponding quality measures have, within ten bits, been determined to fail to fulfil a quality measure criterion, a quality measure being formed as a combination of quality determinations made for segments transmitted at said frequency, update the frequency transmission scheme, where the updating comprises totally reducing the use of frequencies for which the corresponding quality measures do not fulfil a quality measure criterion and remove the frequencies so they cannot be used in the wireless network, and transmit a second number of bits using the updated frequency transmission scheme.

* * * * *